(12) United States Patent
Ohnishi

(10) Patent No.: US 7,379,459 B2
(45) Date of Patent: May 27, 2008

(54) ADDRESS MANAGEMENT METHOD OF MAC BRIDGE AND MAC BRIDGE

(75) Inventor: Hiroya Ohnishi, Chiba (JP)

(73) Assignee: Fujikura Ltd., Tokyo (JP)

( * ) Notice: Subject to any disclaimer, the term of this patent is extended or adjusted under 35 U.S.C. 154(b) by 942 days.

(21) Appl. No.: 10/208,850

(22) Filed: Aug. 1, 2002

(65) Prior Publication Data

US 2003/0031190 A1    Feb. 13, 2003

(30) Foreign Application Priority Data

| Aug. 7, 2001 | (JP) | ............................. 2001-239144 |
| Aug. 9, 2001 | (JP) | ............................. 2001-242525 |

(51) Int. Cl.
*H04L 12/28* (2006.01)
(52) U.S. Cl. ....................... 370/392; 370/401; 370/471
(58) Field of Classification Search ................ 370/401, 370/392, 471
See application file for complete search history.

(56) References Cited

U.S. PATENT DOCUMENTS

| 5,793,764 | A | * | 8/1998 | Bartoldus et al. ........... 370/390 |
| 6,003,137 | A |   | 12/1999 | Kawasaki |
| 6,775,278 | B1 | * | 8/2004 | Britton et al. .............. 370/389 |
| 6,804,233 | B1 | * | 10/2004 | Congdon et al. ........... 370/389 |
| 6,873,603 | B1 | * | 3/2005 | Ivaturi ....................... 370/255 |
| 6,891,840 | B2 | * | 5/2005 | Okada ........................ 370/401 |

FOREIGN PATENT DOCUMENTS

| JP | 10-93610 | 4/1998 |
| JP | 2000-253041 | 9/2000 |

OTHER PUBLICATIONS

Lin, Ying-Bar and Gerla, Mario: Brouter: The transparent Bridge with Shortest Path in Interconnected LANs, IEEE, 1991.*

* cited by examiner

*Primary Examiner*—Edan .Orgad
*Assistant Examiner*—Jay P. Patel
(74) *Attorney, Agent, or Firm*—Oblon, Spivak, McClelland, Maier & Neustadt, P.C.

(57) ABSTRACT

A port management table 2 which stores connectable terminal information indicating an upper limit value of the number of terminals connectable to each port A, B and C is provided in a MAC bridge 1. When address retrieving means 7 of an address learning section 3 receives packet information Hi at the ports A, B and C from terminals of a network, the address retrieving means 7 retrieves the port management table 2. When the upper limit number is satisfied, register number addition/subtraction 8 adds/subtracts the number na of registrations, and writes a transmission origin address of packet information received by address table updating means 9 in an address table 5.

4 Claims, 9 Drawing Sheets

ADDRESS MANAGEMENT METHOD OF MAC BRIDGE AND MAC BRIDGE

BACKGROUND OF THE INVENTION

1. Field of the Invention

The present invention relates to a MAC bridge to which a plurality of networks or a plurality of terminals are connected.

2. Description of the Related Art

A media Access Control (hereinafter referred to as MAC) bridge is a repeater which makes use of data communication system of a data link layer or a MAC layer in IEEE 802.3, and connects a plurality of different LAN (Local Area Network) to each other and a plurality of terminals to each other, thus performing a packet communication between networks as well as between terminals.

Each terminal on the network has an individual address for identifying it from others. This individual address includes a logical address (network address) defined by a network layer and a physical address defined by a data link layer. Under network environments in which the MAC bridge is used, an IP address is mentioned as an example of the logical address, and a MAC address is mentioned as an example of the physical address. The IP address is for identifying individual terminals connected to the network. From the viewpoint of a network constitution, the system of IP address is planned in minute detail and the IP address may not overlap others. For this reason, when the terminal is connected to the network, a correct IP address must be set in the individual terminal according to addressing scheduled in the network.

Generally, the IP address is individually allocated to the terminal by a network manager except the case where the IP address is automatically allocated to the terminal by use of a dedicated server or the like. Specifically, the user himself/herself sets the IP address allocated by the network manager in the terminal, whereby this terminal becomes available in the network.

On the other hand, with respect to the MAC address, manufactures usually allocate it to each apparatus, which is inherent to the apparatus, and the MAC address never overlaps other addresses.

Herein, a schematic constitution view of a conventional network system using a MAC bridge M is show in FIG. 1. The MAC bridge M is described as a MAC bridge for relaying a packet between LANs.

In general, repeater functions of the MAC bridge M include a function to shape the waveform of the packet transmitted when the packet received from a port of an apparatus of itself is relayed to other ports. However, an essential function of the MAC bridge M is a filtering function to transmit the received packet to other ports selectively. An automatic address learning function for preparing an address table automatically in which the relay destinations of the packets are described is used to realize this filtering function.

As shown in FIG. 1, for example, when a terminal A1 connected to a LAN (A) transmits a packet to a terminal A2 which is one of the terminals belonging to the same segment, the communication within the segment of the LAN, which is a fundamental unit in the LAN, adopts a broadcasting type in many cases which informs packet information to all terminals connected to the LAN collectively. Accordingly, the packet transmitted by the terminal A1 arrives at a port A of the MAC bridge M in addition to the terminal A2. At this time, the MAC bridge M does not relay the packet received at the port A to ports B and C.

On the other hand, when the terminal A1 transmits the packet to a terminal B1 connected to another LAN (B), the packet transmitted by the terminal A1 arrives at the port A of the MAC bridge M as well as at all terminals connected to the LAN (A). At this time, the MAC bridge M extracts a destination address existing in a header portion of the packet and retrieves an address table 5 managed within the MAC bridge M as to which port a terminal having an identical address to this extracted address is connected to, thus transmitting the packet to the corresponding port to perform the relay of the packet.

It is called filtering of the packet that the packet received in the above described manner is relayed according to demand and the packet is not relayed if unnecessary.

To perform this filtering, the address table 5 describing which port of the MAC bridge M each terminal device is connected is necessary.

In the address table 5, stored are at least three items including: addresses of the terminals connected to the MAC bridge M through the LAN, port numbers of the MAC bridge M to which the LAN connected to the terminals is connected, and collateral information describing matters relating to the above two items in order to ensure that they correspond to each other.

In the foregoing packet, at least a destination address, a source address and data are included. Upon receipt of the packet, the MAC bridge M extracts the destination address from the packet, and retrieves whether a terminal address coincident with the destination address exists in the address table 5.

Then, when the destination address included in the packet is coincident with the terminal address of the address table 5, (that is, when the terminal which receives the packet is previously registered in the MAC bridge M), and when the port number which received the packet is coincident with the portion number recorded in a corresponding record of the address table 5, the MAC bridge M does not output the received packet from any port.

Specifically, when the transmission side terminal and the receiving side terminal transmit/receive the packet in the same LAN, the MAC bridge M abandons the packet even when the MAC bridge receives the packet.

On the other hand, when the destination address included in the packet is coincident with the terminal address of the address table 5 and the port number which received the packet is different from the port number recorded in the corresponding record, that is, the record in which information relating to the address of the destination terminal is recorded, and when there is no collateral information notifying that transmitting of the packet to other ports in the MAC bridge M is inhibited, the received packet relayed to a port recorded in the corresponding recorded. In other words, the packet is relayed to another LAN.

Moreover, when the terminal address coincident with the destination address of the received packet does not exist in the address table 5, the packet is in many cases relayed to all of other ports other than the port which received the packet, even though the processing concerning the packet differs depending on the apparatuses.

As described above, to allow the MAC bridge M to exhibit the filtering function, the address table 5 is necessary. To register the information relating to the addresses of the terminals in the address table 5, there are two ways. One is manual registering, and the other is registering by means of the automatic address learning function of the MAC bridge M.

To perform the automatic address learning by the MAC bridge M, the automatic address learning of the MAC bridge M is performed according to the following procedures. Specifically, (1) the packet is received through any of the ports of the MAC bridge M, (2) the source address is extracted from the packet, (3) it is retrieved whether the source address has already existed on the address table 5, and (4), if the source address does not exist on the address table 5, a record is additionally registered in the address table 5 so that the record corresponds to the port number of the MAC bridge which received the packet, (5) when the combination of the source address and the port number, previously stored in the address table 5, is different from that of the source address and port number of the actually received packet though the source address exists in the address table 5, the address table 5 is updated so as to correspond to the port which received the packet.

As described above, the automatic address learning is performed according to the procedures (1) to (5), and the address table 5 is prepared. When the packet is received, the filtering function for transmitting the packet selectively from the port according to the address table 5 is realized.

SUMMARY OF THE INVENTION

However, the number of the records that can be registered in the address table 5 of the MAC bridge M is finite. This is because the address table 5 is constructed by use of some kind of storage devices and there is physical limitation to a capacity of the storage devices. For this reason, when the number of the terminals are large, there has been a problem that addresses of all terminals connected to the MAC bridge M cannot be accommodated.

Furthermore, with respect to the number of the records to be registered in the address table 5, management is not performed as to the number of the terminal addresses for which the automatic address learning is conducted for each port of the MAC bridge M. Specifically, the management is not performed as to how number of the terminal addresses should be connected to the port.

In other words, the generation of the address table 5 by the conventional automatic address learning is performed in such a manner that when a packet is received in a port from a new terminal while the address table 5 is not full, information in each packet is stored without any particular limitation so that the address of the new terminal and the number of its port receiving the packet are made to correspond to each other.

However, when the address table 5 becomes once full, a terminal is newly added, and it is impossible to add a record to the address table 5 even if the information is learnt.

Therefore, when a terminal which was not learnt in the address table 5 of the MAC bridge M intends to communicate with other terminals in spite of being newly connected to the LAN, it is impossible to specify a port to which the packet assigned to this terminal is relayed because this terminal is not registered in the address table 5 of the MAC bridge M. Accordingly, a situation that the packet is relayed to a port connected to another LAN and the packet is abandoned without being transmitted occurs, and, as a result, there is a problem that users cannot communicate with terminals of a desired network.

On the other hand, to provide against a problem of being connected to the LAN incorrectly from the viewpoint of the manager of the network, there is a case where the number of users capable of accessing certain service is wished to be limited.

However, until now, notwithstanding that the number of the records that can be stored in the address table 5 of the MAC bridge M is finite, new automatic address learnings are executed to the finite number of the records.

Specifically, it is intended to limit, by the address table 5, the number of the terminals that can be connected to a certain segment, the conventional MAC bridge M additionally stores the MAC address of the terminal automatically connected as described above as long as the address table 5 is not full. Accordingly, there has been no way to limit the number of the terminals connectable by the address table 5.

Accordingly, when a large number of terminals are connected to the network, a user who can relay the packet to a terminal of a desired destination normally and a user who causes trouble with the relay of the packet occur, and there has been a problem that equity of service lacks.

Since the conventional MAC bridge M performs the relay while monitoring only the MAC address of the packet according to a communication protocol of a data link layer, the IP address defined by the network layer is not monitored. Specifically, even if the terminals having the identical IP address are connected to the identical network, the MAC bridge M does not have a function to read the IP address. Accordingly, a packet received irrespective of correctness of the IP address is relayed to a port to which a destination terminal is connected.

As described above, since the assignment of the IP address passes through hands of the manager of the network, overlapping of the IP addresses may occur by mistaking of address setting values set in the terminal and by vicious falsification.

For example, when the IP addresses overlaps because of the mistaken address setting, any of the terminals to the identical IP address is assigned or both of the terminals fall in incapability of communications. Moreover, besides this case, when a person who has obvious malice changes the address of the terminal intentionally and passes himself/ herself off as generalized other, there is a problem that it is possible to perform the communication by concealing his/ her background.

The present invention was made from the viewpoint of the foregoing subjects, and an object of the present invention is to provide a MAC bridge with a connected terminal number management function, which provides an upper limit to the number of terminals that can be connected to a port and is capable of offering fair relay service to users by managing the number of the terminals that can be connected to ports within the upper limit number of the terminals.

In addition to this, another object of the present invention is to provide a MAC bridge which reduces communication troubles in which both terminals is incapable of communication and which improves network security, when the terminals having an identical IP address are connected to a network.

A first aspect of the present invention is an address management method of a MAC bridge, which is connected to a network connecting terminals thereto, has many ports for relaying a packet, and relays the received packet to a network where a terminal having a destination address of the packet exists, the method comprises the steps of: preparing an address table which stores at least one of a plurality of first terminal connection information, each being composed of a terminal address of a packet received by a port and a port number; preparing a port management table which stores at least one of a plurality of second terminal connection information, each being composed of an upper limit number that can connect the terminals for each port number and a present number of the terminals connected to the port having the port number while allowing the upper limit number and the present port number of the terminals to correspond to each other; when the packet is received by the port, retrieving the second terminal connection information having the port number from the port management table; and when the present number of the terminals of the retrieved second terminal connection information is equal to the upper limit number or less, adding the first terminal connection information.

A second aspect of the present invention is a MAC bridge which is connected to a network connecting terminals and has many ports for relaying a received packet through the network in accordance with a destination address, the MAC bridge comprising: an address table storing at least one of a plurality of first terminal connection information, each being composed of an address of the terminal and a port number to which the terminal is connected; a port management table which stores at least one of a plurality of second terminal connection information, each being composed of an upper limit number that can connect the terminals for each port number and a present number of the terminals connected to the port while allowing the upper limit number and the present port number of the terminals to correspond to each other; and an address learning section which when the packet is received by the port, retrieves the second terminal connection information having the number of the port from the port management table and, when the present number of the terminals of the retrieved second terminal connection information is less than the upper limit number, adds the first terminal connection information to execute a connection terminal number management.

A third aspect of the present invention is a MAC bridge which comprises an address table in which a MAC address of a terminal connected to a port is registered and performs a packet processing in accordance with information registered in the address table, the MAC bridge comprising:

setting storage means in which a network address given to the terminal is previously set; and address resolution means for sending out an address resolution request packet including a network address previously set, for receiving a response packet responded from the terminal to which the network address is given, and for setting a MAC address of the terminal, which is included in the response packet, in the address table.

In the third aspect of the present invention, provided are the setting storage means in which the IP address is previously set; and the address resolution means for transmitting the address resolution request packet including the previously set IP address to the terminal connected to the MAC bridge, for acquiring the MAC address of an apparatus having the IP address by extracting the MAC address from the response packet responded and for recording the MAC address in the address table to manage the MAC address. Accordingly, it is possible to relay only a transmission packet from the terminal having the previously set IP address.

In a fourth aspect of the present invention, the setting storage means has a constitution in which automatic address learning information for acquiring the MAC address automatically can be set for a part of the ports, and, when the packet is received by the port for which the automatic address learning information has been set, the MAC address of a source included in the received packet is set in the address table.

In the fourth aspect of the present invention, by providing automatic acquiring information in the setting storage means so that an acquiring method of the MAC address can be designated as well as by setting the IP address in the setting storage means, the MAC address can be acquired by a conventional automatic learning function when "automatic address learning is performed" is set in the automatic learning information.

DETAILED DESCRIPTION OF THE PREFERRED EMBODIMENTS

First Embodiment

Embodiments of the present invention will be described with reference to the accompanying drawings. A first embodiment of the present invention is constructed so that the number of terminals connectable to a port is limited by providing an upper limit value of the number of the terminals connectable to each port of a MAC bridge. The first embodiment of the present invention is a MAC bridge which makes it possible to offer services to users fairly, and a relay is made possible by eliminating old terminals of an address table even when terminal are newly connected to the port.

Figure 1:
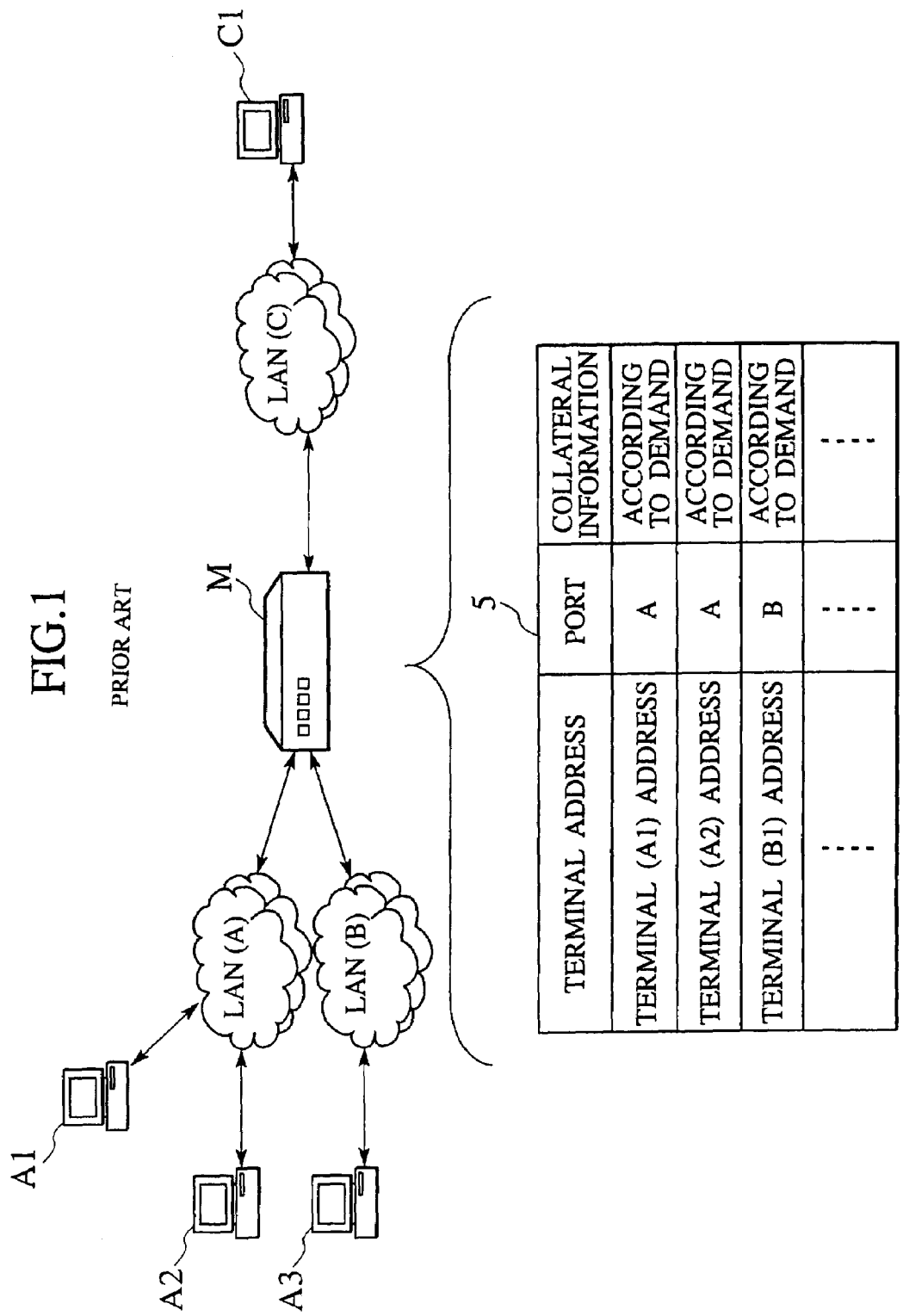
FIG. 1 is a schematic constitution view of a network system using a conventional MAC bridge.
Figure 2:
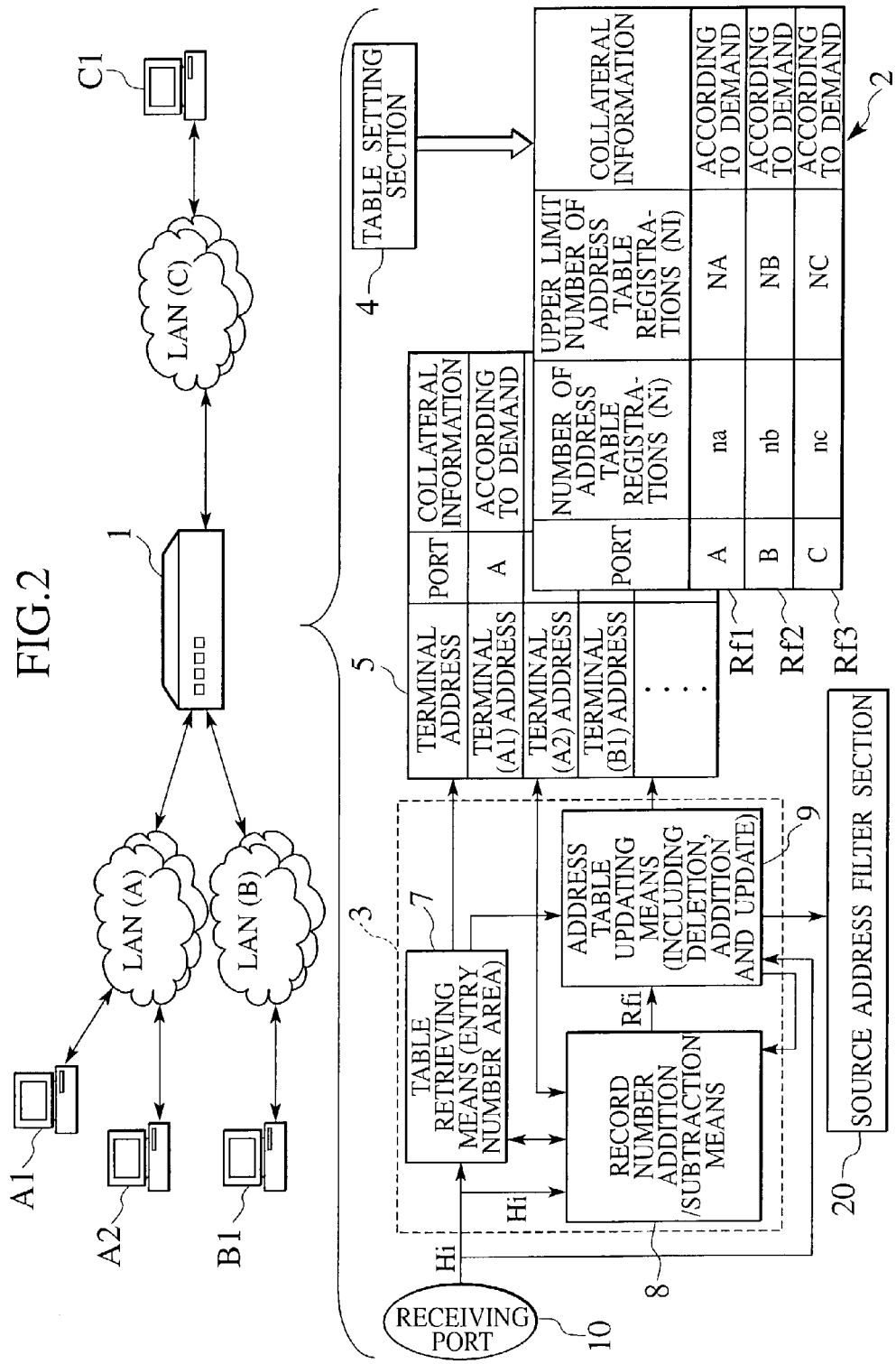
FIG. 2 is a schematic constitution view of a network system using a MAC bridge according to a first embodiment of the present invention.

FIG. 2 is a schematic constitution view of a network using a MAC bridge 1 according to a first embodiment of the present invention. In this embodiment, descriptions will be made on the assumption that three kinds of ports including A, B and C are used. However, the number of the ports may be any value as long as it is equal to one or more.

As shown in FIG. 2, the MAC bridge 1 used in the network shown in this embodiment of the present invention relays a packet received from a certain port to a predetermined port.

As shown in FIG. 2, a LAN (A) is connected to a terminal A1 and a terminal A2, and the LAN (A) is connected to the port A of the MAC bridge 1. Moreover, a LAN (B) is connected to a terminal B1, and the LAN (B) is connected to a port B of the MAC bridge 1. A LAN (C) is connected to a terminal C1, and the LAN (C) is connected to a port C of the MAC bridge 1.

Furthermore, as shown in FIG. 2, the MAC bridge 1 comprises a port management table 2, an address learning section 3, a table setting section 4 and an address table 5.

Each record of the port management table 2 is composed of port numbers A, B and C of the MAC bridge 1, the number Ni of address table registrations corresponding to each port number (the number of present registered records), and an upper limit number NI of the address table registrations. Specifically, the number Ni of the address table registrations and the upper limit NI of the address table registrations are respectively stored so as to correspond to the ports A, B and C.

The address learning section 3 comprises at least table retrieving means 7, record number addition/subtraction means 8 and address table updating means 9, as shown in FIG. 2.

Accompanied with inputting of a packet Hi from each of the terminals A1, A2, B1 and C1 connected to the corresponding LANs through the MAC bridge 1, the table retrieving unit 7 allocates a port number pi that received the packet Hi and stores it. Specifically, the table retrieving unit 7 stores which port each terminal uses. Then,the table retrieving unit 7 retrieves a record Rpj having a source address ha and port number pi of the packet Hi from the inside of the existing address table 5.

Herein, the record concerning the address table 5 means first terminal connection information (Rf1, Rf2, Rf3, . . . Rfi, . . . ) composed of each data including a port number, a terminal address and collateral information. Similarly, a record of the address management table 2 means second terminal connection information composed of each data including a port number, the number Ni of registrations, the upper limit number NI of registrations and collateral information. Note that this is a memory area where the number Ni of the registrations indicating a total sum of the records registered in the address table 5 for each port is presently stored and the upper limit number NI of the registrations indicating the limit number of the records allowed to be registered in the address table 5 for each port is stored.

When this record Rpj cannot be retrieved, a record Rpk, in which a source address ha alone is coincident with the source address ha of the packet Hi of the record Rpk and a port number pi differs from the port number pi of the packet Hi of the record Rpk, is retrieved.

When the record Rpj, in which the foregoing source address ha is coincident with the source address ha of the packet Hi of the record Rpk is coincident with the port number pi of the record Rpk and the port number pi thereof is coincident with the port number pi of the packet Hi of the record Rpk, exists, contents of the existing address table 5 and contents of the port management table 2 are not changed.

When the table retrieving means 7 can not retrieve the record Rpj having the source address and the port number which are coincident with the source address ha of the packet information Hi and the port number pi thereof in the existing address table 5, the record number addition/subtraction means 8 retrieves a record Rfh coincident with the port number pi from the port management table 2. When the present number Ni of the registrations of this record Rfh does not reach the upper limit number NI, "1" is added to the number Ni of the registrations of the record Rfh.

Furthermore, when the present number Ni of the registrations of the record Rfh coincident with the port number pi of the port management table 2 reaches the upper limit number Ni of registrations, the record number addition/subtraction means 8 subtracts "1" from the present number of the registrations Ni if necessary according to the collateral information of the port management table 2. For example, this is a case where the collateral information indicates that the contents of the existing address table 5 are altered when packet information Hi including a new transmission origin address ha is received in a state where the present number Ni of the records reaches to the upper limit number NI.

When the table retrieving means 7 retrieves a record Rpk in which the source address ha alone is coincident and the port number pi differs (it is assumed that the port number of this record is pk), the record number addition/subtraction means 8 sends out a record number of the record Rpk and a deletion instruction to the address table updating means 9 and allows the address table updating means 9 to delete the record Rpk of the address table 5, thus subtracting "1" from the number Ni of the registrations of the record Rfm of the port management table 2 having the port number pk.

The address table updating means 9 writes the record having the source ha and the port number pi in the address table 5 every time the number Ni of the registrations of the record Rfi in the port management table 2 is updated (subtraction, addition) by the record number addition/subtraction means 8.

Figure 3:
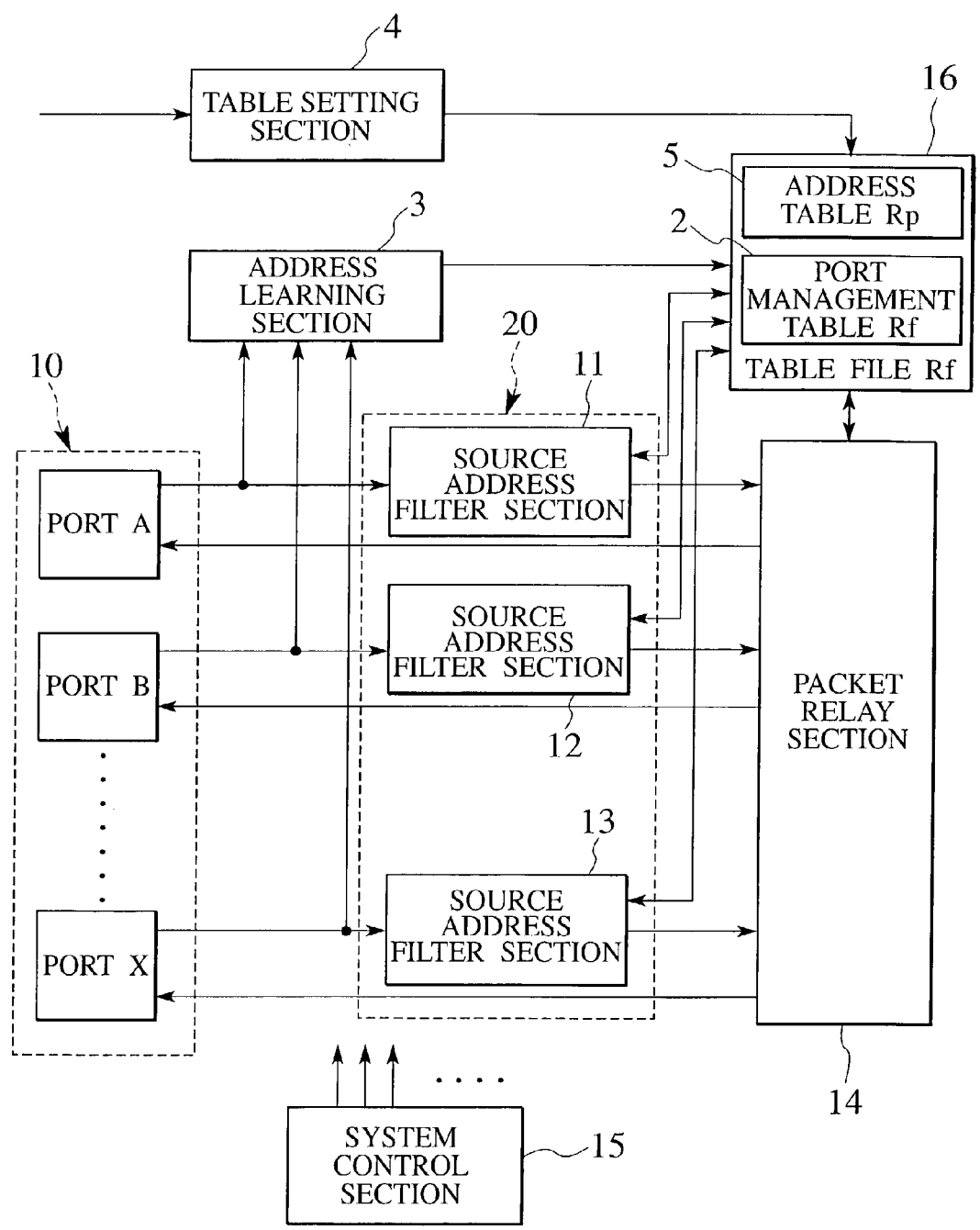
FIG. 3 is a concrete constitution view of the MAC bridge according to the first embodiment of the present invention.

FIG. 3 is a concrete constitutional view of the MAC bridge 1 according to the first embodiment of the present invention. As shown in FIG. 3, this MAC bridge 1 comprises a plurality of ports 10 (port A, port B, . . . port X). A source address filter section 11 is connected to the port A; a source address filter section 12, to the pot B; . . . a source address filter 13, to the port X. In a source address filter 20, each source address filter section corresponds to the corresponding one of the ports, respectively. Accordingly, the source address filter 20 exists by the number of the ports plurally.

Furthermore, an address learning section 3 is connected to these ports A, B, . . . and X to receive the received packet information Hi, and updates the address table 5 by use of the foregoing table retrieving means 7, the record number addition/subtraction means 8, and the address table updating means 9.

When the record Rp having the source address ha of the packet Hi received from each of the ports A, B, . . . and X connected to the respective filter sections and the port number pi does not exists in the address table 5, the source address filter section 20 has a function to abandon the packet Hi. A system control section 15 monitors states of the ports A, B, . . . and X, and allows each portion to start up. The source address filter section 20 and a packet relay section 14 decide based on the foregoing address table 5 whether the packet information Hi should be transmitted, and when it is decided that the packet information Hi should be transmitted, the packet relay section 14 decide to which port the packet information Hi should be transmitted. For example, when the source address ha exists in the address table 5 and exists in the same port as the port number pi received, the packet information Hi is not transmitted to other ports.

As another case, when the destination of the packet Hi is a port different from the receiving port and exists in the address table 5 and when collateral information inhibiting the relay of the packet Hi does not exist, the packet Hi is relayed to the destination port according to the address table 5.

Furthermore, the packet relay section 14 once stores the information of the packet Hi that has been checked by the source address filter section 20, and transmits the information thereof sequentially in accordance with the foregoing decision.

The system control section 15 controls the table setting section 4, the source filter section 20 and the like so that a series of operations described above can be performed smoothly.

The upper limit number NI of the registrations is a value for limiting the number of the terminals connectable to the LAN. The manager of the network sets the upper limit number NI of the registrations artificially by use of an input device (not shown). The table setting section 4 has a function to reflect this artificial setting on a table file 16 within the MAC bridge 1. Herein, the table file 16 is composed of the foregoing address table 5 and the port management table 2.

In the MAC bridge 1, a section for transmitting/receiving signals from the LAN is called a port section 10. Herein, the port section 10 receives the packet Hi from the outside to convert it to a signal suitable for a signal processing inside the MAC bridge 1, and performs a signal conversion for transmitting the packet to the LAN, which has been processed therein.

An operation of the MAC bridge 1 constituted as described above will be described below. An additional explanation for the port management table 2 of FIG. 2 will be made. First, the port management table 2 of FIG. 2 represents that with respect to the port A, na is written as the present number of the registrations Ni and NA is written as the upper limit number NI of the registrations. Similarly, the port management table 2 of FIG. 2 represents that with respect to the port B, nb is written as the present number of the registrations and NB is written as the upper limit number of the registrations. Moreover, the port management table 2 of FIG. 2 represents that with respect to the port C, nc is written as the present number of the registrations and NC is written as the upper limit number of the registrations.

Furthermore, there is no limitation to the concrete contents of the collateral information. As an example of the collateral information, there is information indicating with what policy the reduction and addition of the records are executed with a policy when the number Ni of the registrations of the address table related to a certain port at a certain point of time is equal to the upper limit number Ni and the source address of the packet Hi received from this port is new. To be concrete, (a) the addition of a new address is not executed when the address table 5 is full. Specifically, the change of the address table 5 is not executed. (b) Among the addresses related to this port that has been already existed in the address table 5, the oldest record (the longest time has passed after finally receiving a packet in which this address is indicated in the source address of the received packet) is deleted, and an address of a packet received newly is added. (c) If there is a record which is oldest and shows the passage of time over a certain time among the addresses related to the port that has already existed in the address table 5, this record is deleted, and an address of a packet newly received is added to the address table 5.

Figure 4:
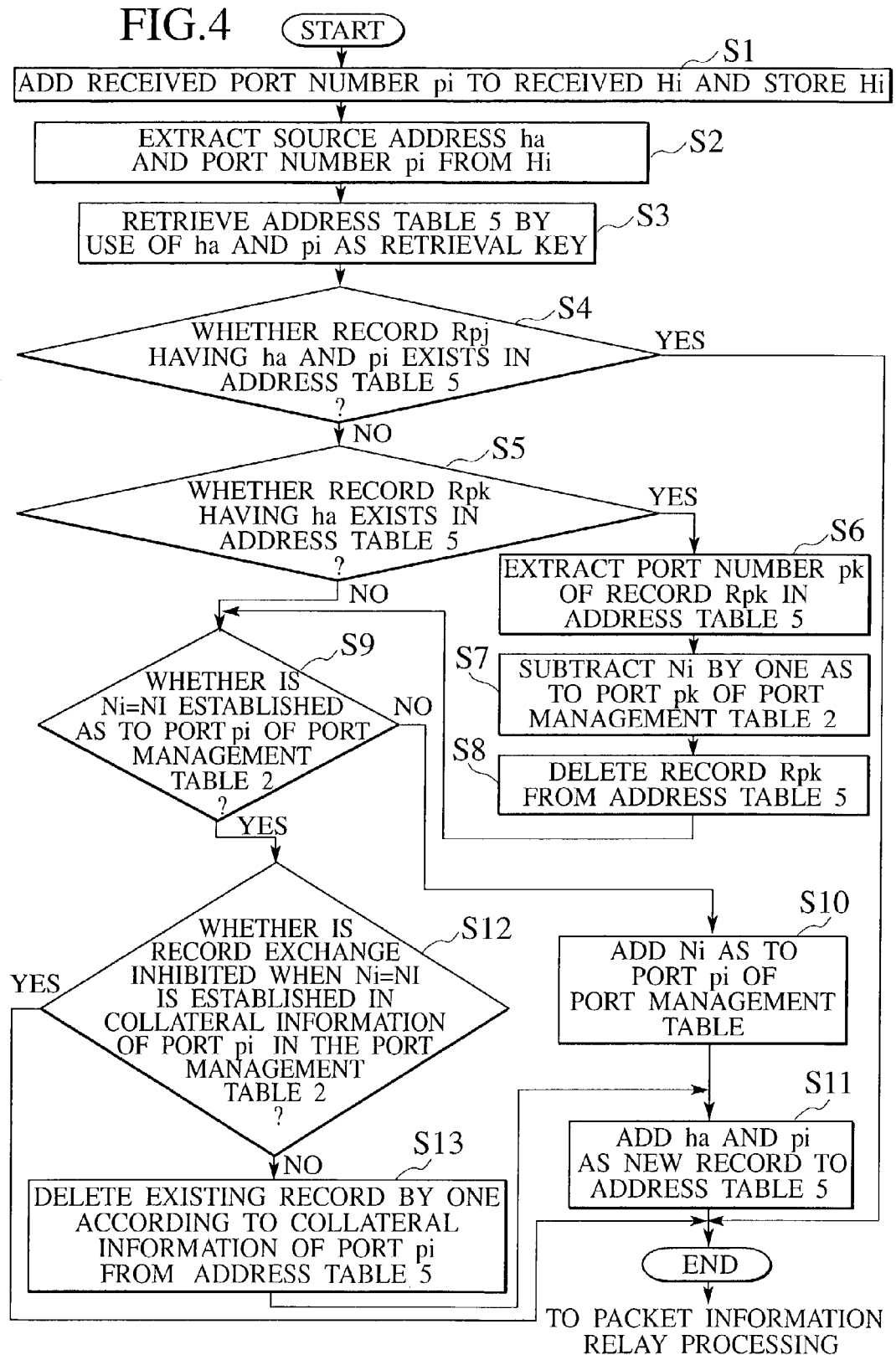
FIG. 4 is a flowchart for explaining an operation of the MAC bridge according to the first embodiment of the present invention.

A method of managing the address table 5 and the port management table 2 will be described by use of the flowchart of FIG. 4.

When a packet Hi from a certain port is received in, for example, the port A, the address learning section 3 adds the port number (A) to information of the received packet Hi and stores it (Step 1). At this time, the packet Hi is stored also in the source address filter section 11.

Figure 5:
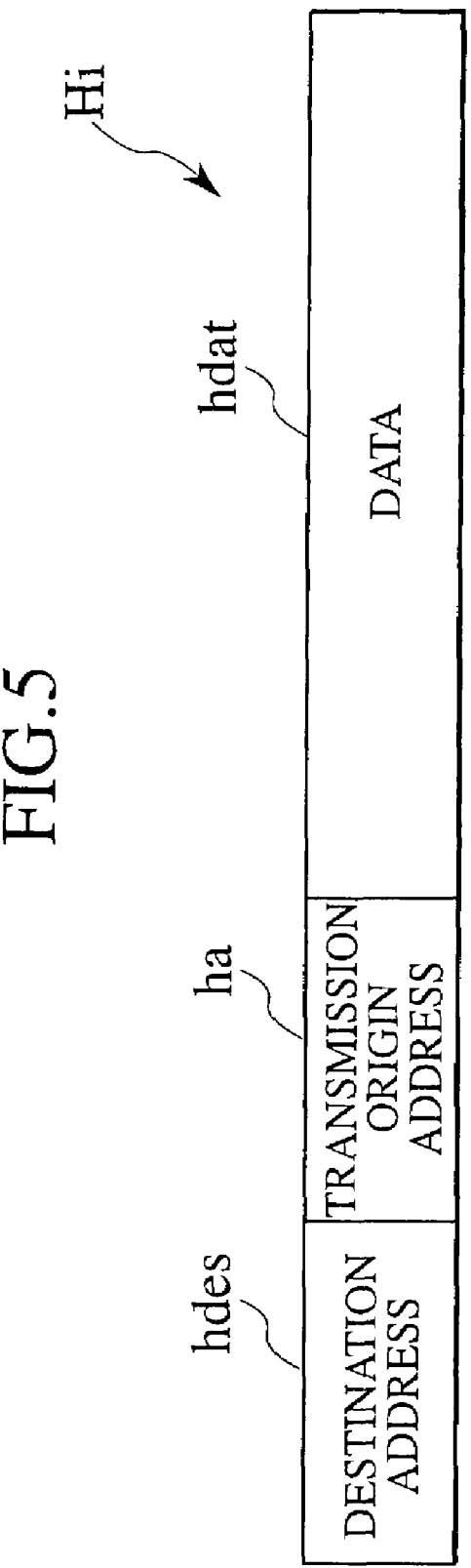
FIG. 5 is an explanatory view of an example of a packet according to the first embodiment of the present invention.

This packet Hi is composed of a destination address hdes, a source address ha and data hdat, as shown in FIG. 5.

Next, the table retrieving means 7 of the address learning section 3 extracts the source address ha and the port number pi (A), which shows that the port number pi had been tied to the port A), from the header portion of the packet Hi (Step 2).

Then, the table retrieving means 7 retrieves the address table 5 (Step 3), and decides whether the record Rpj having the source address ha and the port number pi, which were extracted, exists (Step 4).

In Step 4, when it is decided that the record Rpj having the source address ha and the port number pi, which are coincident with the source address ha and the port number pi of the record Rpk, does not exist, the table retrieving means 7 decides whether the record Rpk having the source address ha exists (Step 5).

Step 6 is performed when the record Rpk having the source address ha exists in the address table 5. At this time, the record number addition/subtraction means 8 extracts the port number pk from the record Rpk.

Next, a record Rf1 including the port number pk is detected from the port management table 2, and "1" is subtracted from the number Ni of the registrations of addresses included in the detected record Rf1, and the subtraction result is updated to be stored in the number Ni of the registrations of the address table 5 (Step 7). Moreover, at the same time, the record Rpk that has been previously detected is deleted from the address table 5 (Step 8).

In Step 5, when the record Rpk having the source address ha does not exist in the address table 5, the entry number addition/subtraction means 8 retrieves a record including the port number pi from the port management table 2, and compares the upper limit value NI of the registrations with the number Ni of the registrations, which are included in the record detected (Step 9).

In Step 9, when it is decided that the number Ni of the registrations has not reached the upper limit number NI of the registrations yet (when it is decided that the number Ni of the registrations is less than the upper limit number NI of the registrations), "1" is added to the record Rfh of the port management table 2 (Step 10).

Next, the address updating means 9 registers the source address ha of the packet Hi and the received port number pi as a new record in the address table 5 while allowing the source address ha and the port number pi to correspond to each other (Step 11).

For example, when the source address of the packet information Hi is "111", "111" is written to the address of the record Rp1.

Furthermore, in Step 9, when it is decided that the number Ni of the registrations of the record Rf of the port management table 2 corresponding to the port number pi has already reached the upper limit number NI of the registrations, the collateral information of the record Rf of the port management table 2 is confirmed (Step 12). When the effect that the record exchange is inhibited when the number Ni of the registrations and the upper limit number NI of the registrations are equal is described in the collateral information, the procedure is completed because the record cannot be updated.

Furthermore, when the effect that the record exchange is inhibited is not described in the collateral information, a record that may be deleted among the records is deleted by one (Step 13), and the procedure advances to Step 11.

Second Embodiment

Next, a second embodiment of the present invention will be described with reference to the drawings. Note that the same and equivalent constituent components to those of the first embodiment are denoted by the same reference numerals.

A MAC bridge according to the second embodiment is a MAC bridge 100, which comprises an address table for storing a MAC address of a terminal as well as an IP address thereof. The MAC bridge 100 relays a packet from a terminal having an IP address previously offered by an Internet Service Provider (ISP) or a network administrator to a user who erroneously has set an IP address in his/her terminal, which is different from that offered by the Internet connection interest, as well as to a user who intentionally sets any one of IP addresses of other terminals in his/her terminal and falsifies other information, and can abandon other packets therein even if the user receives them.

Figure 6:
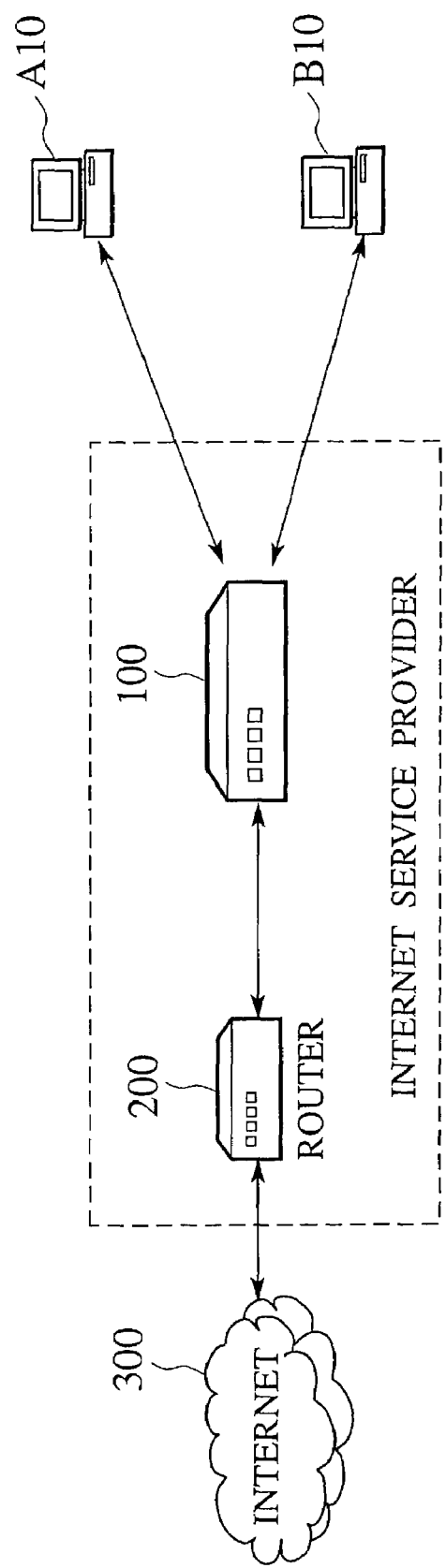
FIG. 6 is a schematic constitution view of a MAC bridge according to a second embodiment of the present invention.

FIG. 6 is a schematic constitution view of a network system using the MAC bridge according to this embodiment.

In this embodiment, this network system is composed of an Internet network 300 and the MAC bridge 100 connected to the Internet network 300 through a router 200. Herein, the router 200 and the MAC bridge 100 are managed by Internet Service Provider.

In the constitution of FIG. 6, the MAC bridge 100 has a port section 10 composed of a plurality of ports A, B, . . . and X, and a terminal is connected to a port at one-to-one correspondence. In this embodiment, the terminal A1 is connected to the port A, the terminal B10, is connected to the port B, and the router 200 is connected to the port X. Note that an IP address of the terminal A10 is "19*. 16*. 0.1" (*: integer) and a MAC address thereof is "N1". Furthermore, note that an IP address of the terminal B1 is "19*. 16*. 0.2" and a MAC address thereof is "N2".

Figure 7:
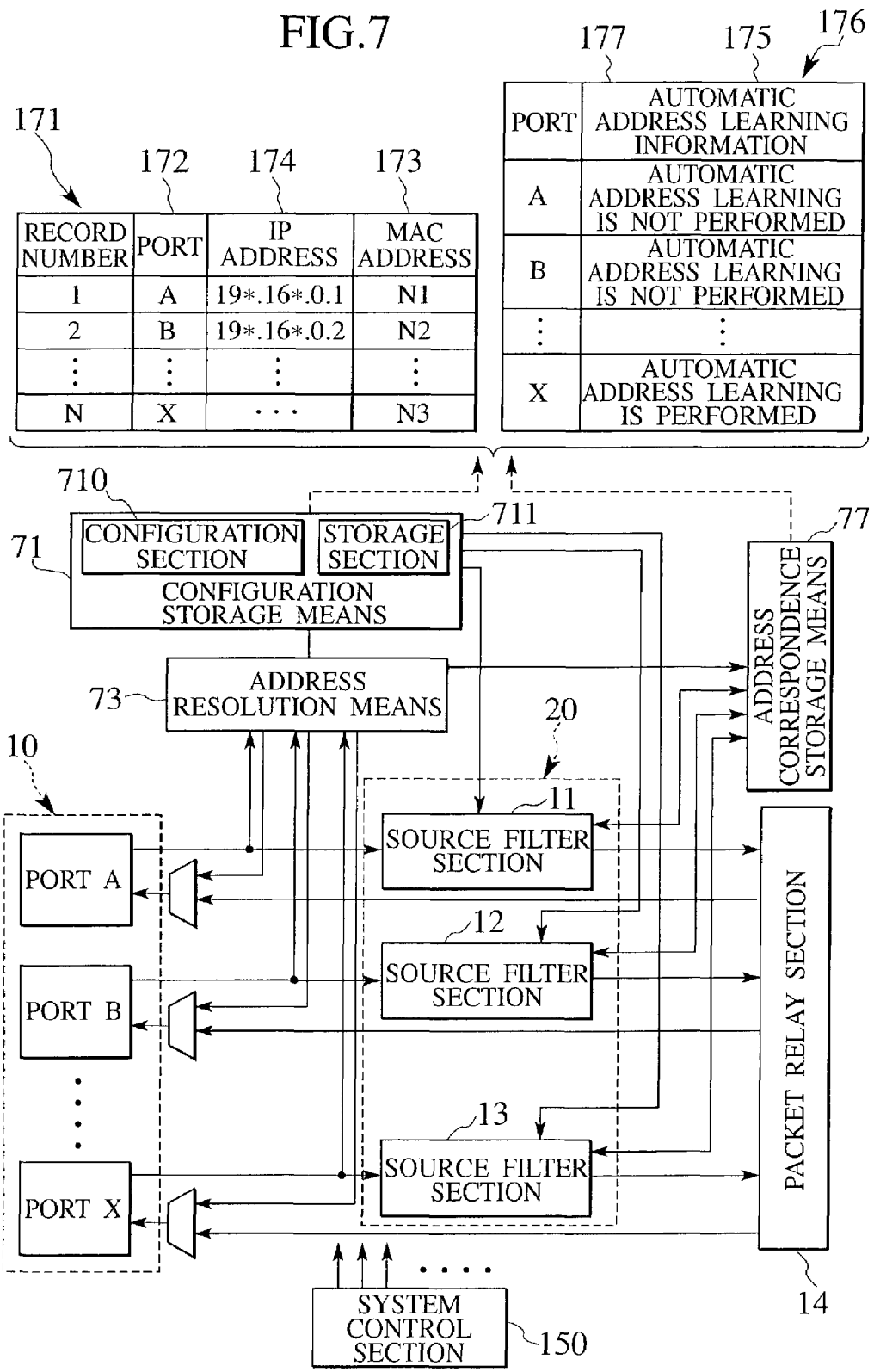
FIG. 7 is a concrete constitution view of the MAC bridge according to the second embodiment of the present invention.

FIG. 7 is a concrete constitution view of the MAC bridge 100 according to this embodiment.

As shown in FIG. 7, the MAC bridge 100 is constituted by a port section 10 for performing transmission/receiving of a packet Hi; address resolution means 73 for taking in the packet Hi arriving at the port section 10, referring to an address table 171 stored in configuration storage means 71, and outputting a processed result; address correspondence storage means 77 for receiving the processed result to update the address table 171; a source address filter section 20 (11, 12, 13) for performing filtering with reference to the address table 171 updated by the address correspondence storage means 77 as to whether the packet Hi arriving at the port section 10 should be relayed; a packet relay section 14 for temporarily storing the packet decided to be relayed; and a system control section 150 for controlling a series of these operations.

In this embodiment, the port section 10 is composed of the plurality of ports including the port A, the port B, . . . and the port X, and the source address filter section 11 is connected to the port A. Similarly, the source address filter section 12 is connected to the port B, and the source address filter section 13 is connected to the port X.

The configuration storage means 71 is a functional section which has a configuration sub-section 710 for configuration information inputted from an I/O device in the address table 171 and the port setting table 176; and a storage sub-section 711 for storing the address table 171 and the port setting table 176. Items included in the information inputted by the I/O device or the like (not shown) thereto are a port number 172 and IP address 174 of the address table 171 and a port number 177 and automatic address learning information 175 of the port setting table 176. The address table 171 and the port setting table 176 are stored in a storage section. Note that record numbers (1, 2, . . . ) different from each other are given to the address table 171. Moreover, in the automatic address learning information 175 of the port setting table 176, an item for setting whether an automatic address learning function should be operated, that is, either "automatic address learning is performed" or "automatic address learning is not performed", is set.

The address resolution means 73 monitors the automatic address learning information in the port setting table 176 stored in the configuration storage means 71. When it is detected that "automatic address learning is performed" is set, the automatic address learning function similar to the conventional MAC bridge is operated, and the MAC address is acquired. On the contrary, when it is detected that "automatic address learning is not performed" is set, the address resolution means that is a gist of this embodiment is operated, and the MAC address is acquired. The address resolution is executed by utilization of ARP (Address Resolution Protocol).

Herein, ARP means a communication function for acquiring a MAC address of a terminal from an IP address of the terminal on a network. Next, a concrete operation of the ARP will be described.

An ARP request packet including an IP address of a terminal desired to be detected is generated. A destination MAC address of the ARP request packet is set in a broadcast so that all terminals can receive the ARP request packet. With respect to the ARP request packet transmitted to the terminals, only the terminal having this IP address performs a response processing for the ARP request packet. Note that other terminals which received the ARP request packet abandon request packets other than those addressed to these terminals. The terminal which received the ARP request packet attaches its own MAC address to this packet, and generates an ARP response packet. Then, this terminal sends back the ARP response packet to the requester. Thus, the MAC bridge 100 can acquire the MAC address of an objective terminal, that is, a terminal to which the set IP address is given.

Note that the address resolution means 73 outputs this data to the address correspondence storage means 77 to record the MAC address acquired by use of the ARP in the address table 171 while allowing the MAC address and the IP address to correspond to each other.

The address correspondence storage means 77 is a functional section which stores the MAC address in the address table 171 and updates the MAC address which the address resolution means 73 acquires by use of either an automatic learning function or an ARP function.

The source address filter section 20 performs filtering with reference to the address table 171 prepared by the address correspondence storage means 77 as to whether the packet arriving at the port section 10 should be relayed. In addition, the source address filter section 20 is a functional section which executes the filtering by a control from the system control section 150 and stops the filtering (stops the filtering and outputs all received packets to the packet relay section 14).

Upon receipt of a packet Hi, the source address filter section 20 extracts a source MAC address from the packet Hi, and retrieves whether a MAC address coincident with this source MAC address exists in the address table 171. When the MAC address 173 coincident with the source MAC address is detected, the source address filter section 20 outputs the packet Hi to the packet relay section 14. On the contrary, when the MAC address 173 coincident with the source MAC address does not exist and when, in the port setting table 176, the automatic address learning information 175 of the port is set to "automatic address learning is not performed", the source address filter section 20 does not output the packet Hi to the packet relay section 14 and abandons the packet Hi (filtering).

The packet relay section 14 is a functional section in which the packet Hi for which the filtering is executed by the source address filter section 20 is temporarily stored. The packets stored in the packet relay section 14 are transmitted sequentially from the port section 10.

The system control section 150 is a functional section which monitors states of the ports A, B, . . . and X, and controls the configuration storage means 71, the source address filter section 20 and the like so that each section starts up and a series of operations of the sections are operated smoothly.

Figure 8:
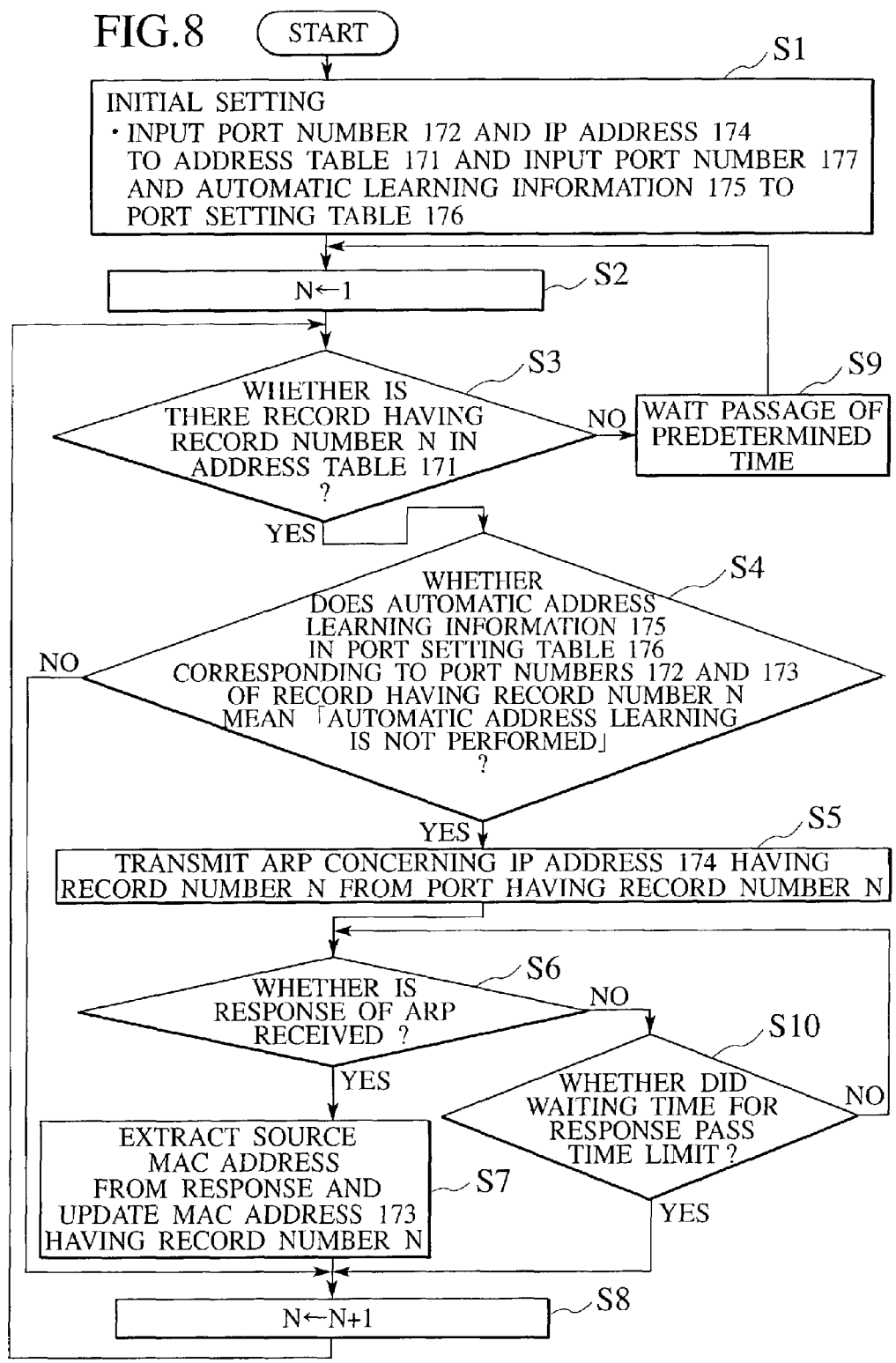
FIG. 8 is a flowchart showing procedures for preparing an address table according to the second embodiment of the present invention.

FIG. 8 is a flowchart showing preparing procedures of the address table 171.

As a preliminary step, the network administrator (Internet service provider) previously allocates an IP address to a network connection subscriber, which does not overlap others, and notifies the IP address to each subscriber. Each subscriber who received the notification sets the allocated IP address to his/her own terminal.

First, in Step 1, as initial setting, among information managed by the network administrator, a port number 172 and an IP address 174 are set in the address table 171 stored in the configuration storage means 71, and a port number 177 and an automatic address learning information 175 are set in the port setting table 176. In items of the automatic address learning information 175, either "automatic address learning is performed" or "automatic address learning is not performed" is set.

For example, as shown in FIG. 6, when the IP address of the terminal A1 is set as "19*.16*.0.1" and when the IP address of the terminal B1 is set as "19*.16*.0.2", these values are set in the address table 171 and the port setting table 176 of FIG. 7 so as to correspond to the port number. Thus, in the column of the record number "1" of the address table 171, the port number is set as "A", and the IP address is set as "19*.16*.0.1". "automatic address learning is not performed" is set in the automatic address learning information in the column of the port setting table 176 in which the port number is A. Similarly, in the column of the address table 171 in which the record number is "2", the port number is set as "B", and the IP address is set as "19*.16*.0.2". The automatic address learning information in the column of the port setting table 176 in which the port number 177 is B is set as "automatic address learning is not performed". On the other hand, the port X is connected to the router 200, and it is unnecessary to consider the error of the address. Accordingly, the automatic learning information 175 in the column of the port setting table 176 in which the port number is X is set as "automatic learning is performed" in this embodiment.

Next, in Step 2, "1" is set in the record number N.

Subsequently, in Step 3, the address resolution means 73 retrieves whether record corresponding to the record number set exist in the address table 171.

Step 4 corresponds to a case where the records corresponding to the record number set are detected. The address resolution means 73 retrieves a record having the port number 177, which is the same as the port number 172 of the address table 171 included in this record, from the port setting table 176 and confirms by which of "automatic address learning is performed" and "automatic address learning is not performed" the automatic address learning information 175 of the record is set.

Step 5 corresponds to a case where "automatic address learning is not performed" is detected in Step 4. The address resolution means 73 generates an ARP request packet including the IP address of the corresponding record, and outputs the ARP request packet to a port registered in this record of the address table 171.

Next, Step 6 is a state where a response packet is sent back from an objective terminal in response to the transmitted ARP request packet or the response packet is waited to be received therefrom.

Step 7 corresponds to a case where the response packet is received. The address resolution means 73 extracts the source MAC address from the response packet, and outputs the source address MAC address to the address correspondence storage means 77. The address correspondence storage means 77 newly registers the source MAC address and the IP address in the address table 171 so as to correspond to each other, or updates them if they have been already registered therein.

Finally, in Step 8, "1" is added to the record number, and the procedure returns to Step 3. Then, the foregoing steps are repeated. Thus, the MAC address of the terminal having the IP address can be surely acquired based on this IP address, and stored.

Note that Step 9 is a case where the corresponding record is not detected in Step 3. For example, after reading of all records registered in the address table 171 was completed and a certain period of time has passed, which can be arbitrarily set, the procedure returns to Step 2 again, and the acquisition of the MAC address is started from the record number (N=1).

Note that when it is detected in Step 4 that "automatic address learning is performed", the procedure advances to Step 8 because the MAC address is acquired by use of the automatic address learning function described in the first embodiment 1.

Step 10 is a case where a response waiting time of the response packet passes the time limit in Step 6. When a predetermined period of time has passed until the response packet is sent back after the request packet is transmitted, the acquisition of the MAC address of this terminal is stopped, and the procedures advances to Step 8. Thus, reading of a next record is performed.

By the above steps, the address table 171 stored in the address correspondence storage means 77 is prepared.

Figure 9:
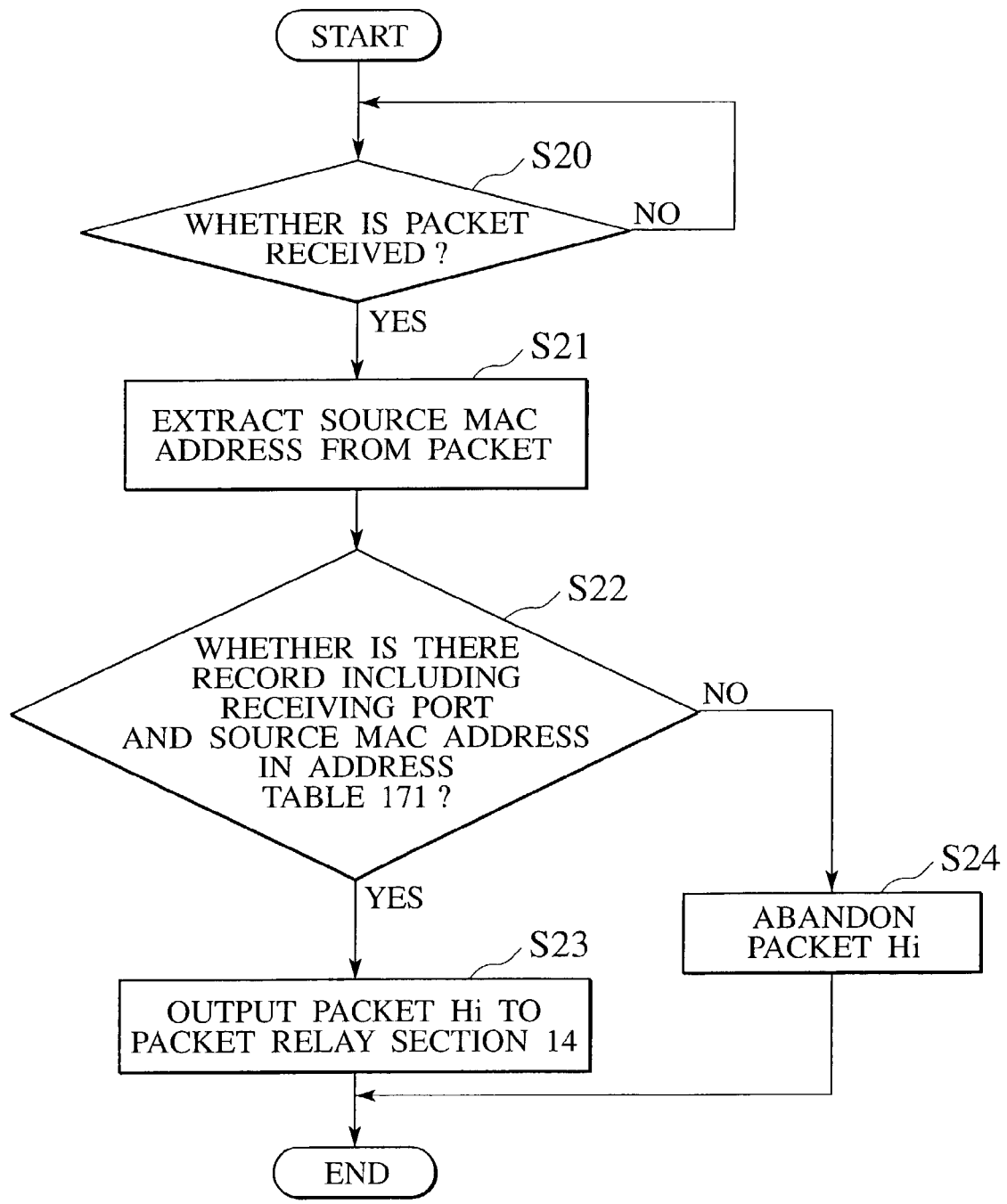
FIG. 9 is a flowchart showing filtering procedures of the MAC bridge according to the second embodiment of the present invention.

FIG. 9 is a flowchart showing filtering procedures of the source address filter section 14, and the filtering procedures are executed when the automatic address learning information 175 corresponding to the port number of the port in the port setting table 176 set as "automatic address learning is not performed".

First, in Step 20, the packet Hi received in each port is always being monitored.

Step 21 is a case where the packet Hi is received in Step 20. The packet is sent to the source address filter section 20, and only the source MAC address is extracted from the packet Hi. For example, when the packet Hi is received from the terminal A1 connected to the port A, the packet Hi is sent to the source address filter section 14, and only the source MAC address Ni existing in the header portion of the packet is extracted.

Next, in Step 22, the source address filter section 20 refers to the address table 171 stored in the address correspondence storage means 77, and compares a record corresponding to the received port number with the address table 171. The source address filter section 20 retrieves whether an address coincident with the source MAC address extracted in this record exists. To be concrete, it is confirmed whether the source MAC address N1 extracted from the received packet exists in the record in which the port number 172 of the address table 171 is A.

Step 23 is a case where the MAC address 173 coincident with the source MAC address is detected as a result of the retrieval. The coincidence of the MAC address 173 with the source MAC address indicates that it can be confirmed that the terminal having the IP address previously given by the Internet service provider transmits the packet Hi. Thus, the packet Hi of the source address filter section 20 is output to the packet relay section 14 to be transmitted to the objective terminal.

On the other hand, Step 24 is a case where the MAC address coincident with the source MAC address was not detected as a result of the retrieval in Step 22. Based on the noncoincidence of the MAC address with the source MAC address, it is possible to confirm that the terminal connected to this port is the one which doesn't have the IP address previously given by the Internet service provider. For example, when the source MAC address extracted from the packet Hi received from the port A is other than N1 (e.g., N2, N3, . . . ), this packet is abandoned by the source address filter section 20.

Specifically, when the terminal setting the erroneous IP address transmits the packet Hi, the record corresponding to the MAC address 173 of the terminal is not recorded in the address table 171 managed by the MAC bridge that received the packet Hi. Accordingly, the packet is filtered (abandoned) by the source address filter section 20. For example, even if an inquiry of the MAC address to the terminal is made by use of ARP, it is impossible to find out the corresponding terminal. Accordingly, even if the inquiry of the MAC address is made by use of the ARP, the time-out is brought about, and the registration is never made. As a result, the MAC address of the terminal given with the erroneous IP address acquisition is never acquired.

Accordingly, according to this embodiment, since the MAC address of the terminal having the IP address can be surely acquired by use of the ARP to be recorded in the address table 171, a packet transmitted from a terminal attached with an erroneous IP address can be identified based on the MAC address even if this packet is transmitted from such a terminal.

Moreover, since, by providing the automatic address learning information 175 in the address table 171, the automatic address learning function that is a conventional function can be used as it is, the MAC address is acquired by an ordinary automatic address learning function as the port X, and the packet can be also relayed.

What is claimed is:

1. An address management method of a MAC bridge configured to receive a packet via one of ports respectively connected to the networks, from one of networks each to which one or more terminals are connected, and relays the received packet to a network in which a terminal having a destination address of the received packet exists, the method comprising the steps of:

preparing an address table having at least one piece of first terminal connection information in which an address of one terminal is associated with a port number of one port connected to the one terminal via one network, for each of the terminals connected to the networks;

preparing a port management table having at least one piece of second terminal connection information in which an upper limit number of terminals connectable to one port is associated with a present number of the terminals connectable to the one port for each of the ports;

retrieving from the address table a certain one piece of the first terminal connection information having a source address of a packet and a port number of one port when receiving the packet from the one port, and then obtaining from the port management table a certain one piece of the second terminal connection information with respect to the port number of the one port when the certain one piece of the first terminal connection information is not retrieved; and adding a predetermined number to a present number of terminals in the certain one piece of second terminal connection information when the present number of the terminals is less than the upper limit number of the terminals in the certain one piece of the second terminal connection information, and then writing the certain one piece of the first terminal connection information in the address table.

2. A MAC bridge configured to receive a packet from one of networks each to which one or more terminals are connected, and relay the received packet to a certain network in which a terminal having a destination address of the received packet exists, comprising:

a plurality of ports connected to the networks, respectively;

an address table having at least one piece of first terminal connection information in which an address of one terminal is associated with a port number of one port connected to one terminal via one network, for each of the terminals connected to the networks; and a port management table having at least one piece of second terminal connection information in which an upper limit number of terminals connectable to one port is associated with the present number of the terminals connected to the one port via one network for each of the ports; and an address learning section connected to the ports, the address learning section comprising:

a retrieving means for retrieving from the address table a certain one piece of the first terminal connection information having a source address of a packet and a port number of one port when receiving the packet from the one port, and then obtaining from the port management table a certain one piece of the second terminal connection information with respect to the port number of the one port when the certain one piece of the first terminal connection information is not retrieved;

a record addition/subtraction means for adding a predetermined number to the present number of terminals in the certain one piece of the second terminal connection information when the present number of the terminals is less than the upper limit number of the terminals in the certain one piece of the second terminal connection information; and an address table updating means for writing the certain one piece of the first terminal connection information in the address table when the record addition/subtraction means adds the predetermined number to the present number of the terminals in the certain one piece of the second terminal connection information.

3. The MAC bridge according to claim 2, wherein the port management table has collateral information for each piece of the second terminal connection information; and when the present number of the terminals of the certain one piece of the second terminal connection information reaches the upper limit number, the address table updating means updates the certain one piece of the first terminal connection information in accordance with the collateral information attached to the certain one piece of the second terminal connection information.

4. The MAC bridge according to claim 2, wherein the port management table has collateral information for each piece of the second terminal connection information; and when the present number of the terminals of the certain one piece of the second terminal connection information reaches the upper limit number and the address table updating means does not update the certain one piece of the first terminal connection information in accordance with the collateral information attached to the certain one piece of the second terminal connection information, the MAC bridge does not relay the received packet to other ports.

* * * * *